US010296291B1

(12) United States Patent
Schmitt et al.

(10) Patent No.: US 10,296,291 B1
(45) Date of Patent: May 21, 2019

(54) STATELESS SCHEDULING

(71) Applicant: Amazon Technologies, Inc., Reno, NV (US)

(72) Inventors: Ryan Charles Schmitt, Seattle, WA (US); Paul David Franklin, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 422 days.

(21) Appl. No.: 13/867,923

(22) Filed: Apr. 22, 2013

(51) Int. Cl.
*G06F 16/00* (2019.01)
*G06F 7/24* (2006.01)
*G06F 16/683* (2019.01)
*G06F 16/11* (2019.01)

(52) U.S. Cl.
CPC .............. *G06F 7/24* (2013.01); *G06F 16/113* (2019.01); *G06F 16/683* (2019.01)

(58) Field of Classification Search
CPC ............ G06F 11/1004; G06F 12/1408; G06F 21/6218; G06F 2221/2107; G06F 2221/2151; G06F 16/683; G06F 1/08; G06F 1/10; G06F 1/12; G06F 1/14; G06F 15/161; G06F 16/00; G06F 17/15; G06F 17/18; G06F 7/588; G06F 16/113; G06F 16/1748; G06F 16/2365; G06F 16/128; G06F 16/13; G06F 16/1805; G06F 16/1873
See application file for complete search history.

(56) References Cited

U.S. PATENT DOCUMENTS

| | | | | |
|---|---|---|---|---|
| 2007/0027657 | A1* | 2/2007 | Pinnegar et al. | 702/189 |
| 2007/0226685 | A1* | 9/2007 | Kaakani et al. | 717/108 |
| 2007/0239774 | A1* | 10/2007 | Bodily et al. | 707/103 R |
| 2009/0244067 | A1* | 10/2009 | Pikovsky et al. | 345/440 |
| 2011/0196900 | A1* | 8/2011 | Drobychev | G06F 17/30575 707/812 |
| 2013/0111172 | A1* | 5/2013 | Gao | G06F 12/02 711/165 |
| 2013/0117264 | A1* | 5/2013 | Ishikawa | G06F 3/0607 707/736 |

* cited by examiner

*Primary Examiner* — Dinku W Gebresenbet
(74) *Attorney, Agent, or Firm* — Davis Wright Tremaine LLP

(57) ABSTRACT

Items in a sequence are associated with items in a set of items to be visited, such as data objects stored by a data storage system. A scheduling algorithm schedules visitation of the items in a manner that is stateless, so that items can be removed or added to the set without affecting previously scheduled visitations of the remaining items. The scheduling algorithm also spreads visitations among the items in a manner that prevents visitations from being focused on clusters of the items.

24 Claims, 9 Drawing Sheets

STATELESS SCHEDULING

BACKGROUND

In a wide variety of contexts, it is desirable to visit items in a set. One or more processes used in a data storage system, for example, may visit data objects stored by the data storage system to perform various operations that facilitate the data storage system's effective and efficient operation. In some instances, the manner in which items in a set are visited can have a material effect on a system's operation. For example, if the items in a set are sequentially numbered, simply visiting the items in the set according to their place in a sequence may cause system performance degradation, depending on how the system is configured. In the context of a data storage system, for example, if items proximate to one another in a sequence are more likely to be clustered in data storage locations of the data storage system, the data storage system may experience uneven load. Such performance degradations may have adverse effects on a system's overall performance, such as when multiple simultaneous attempts to utilize the system are made.

BRIEF DESCRIPTION OF THE DRAWINGS

Various embodiments in accordance with the present disclosure will be described with reference to the drawings, in which.

DETAILED DESCRIPTION

Figure 1:
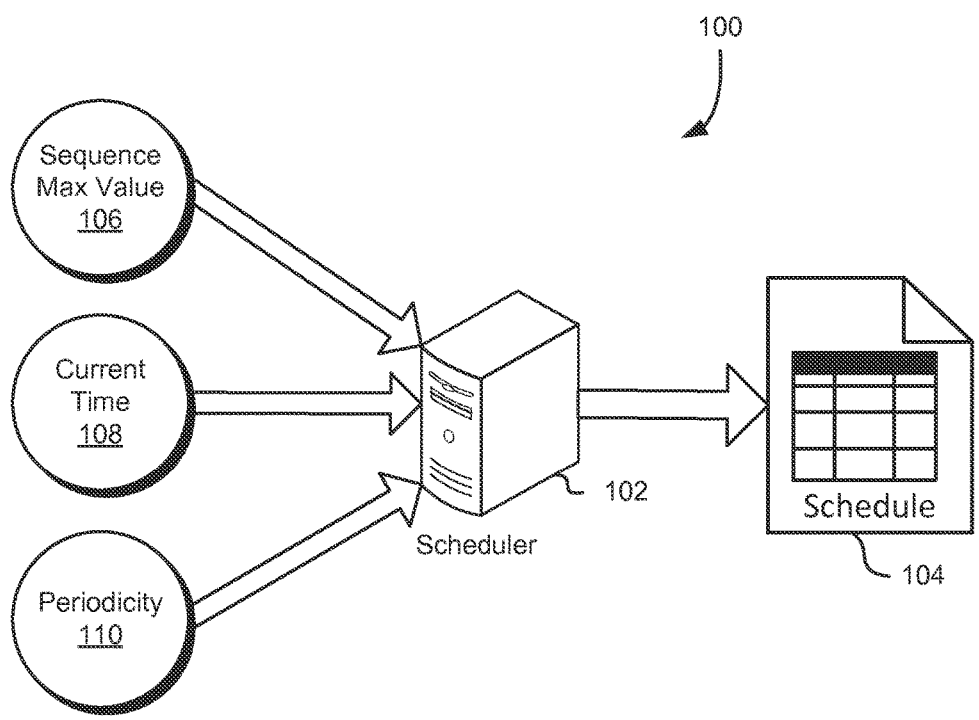
FIG. 1 shows an illustrative example of a diagram illustrating various aspects of the present disclosure in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include techniques for scheduling visitation of items of a set. In some examples, the items in the set are data objects or logical containers for data objects and visiting the items includes performing one or more operations on the items. The operations may include, for instance, migrating data objects from one data storage system to another. Other example operations are discussed below. In various embodiments, items in a set are assigned item values, which may be identifiers for the items. In the context of items being data objects, the item values may be keys utilized by a key-value data storage system (key-value store) such that the identifiers are usable to access the data objects from the key-value store.

The item values given to items in a set may be assigned to avoid adverse consequences potentially caused by naïve assignment schemes, such as by assigning identifiers using a strictly ascending integer sequence. For instance, data objects may be assigned keys to avoid uneven load on a data storage system that stores the data objects. In an embodiment, identifiers are generated based at least in part on a range of integers. Integers in the range are used to generate corresponding identifiers. In one example, numbers in the range ending with the digit zero are excluded and numbers having a nonzero trailing digit have their digits reversed. For example, 6192007, 6192008 and 6192009 would be used to generate identifiers that are respectively based at least in part on 7002916, 8002916 and 9002916 while 6192010 would be excluded for ending in a zero. In some examples, 7002916, 8002916 and 9002916 are used as the identifiers or as part of the identifiers, such as the leading characters of the identifiers. In this manner, keys for data objects are generated sequentially in a serial manner that avoids identifiers proximate to one another in the sequence from being proximate to one another numerically (using a Euclidian metric).

Various embodiments of the present disclosure also relate to scheduling visitation of items in a set that provide useful properties. For example, the various techniques described herein are usable to prevent partition heat in a data storage system, which can adversely affect overall performance and make parallelization more difficult. Further, the techniques described herein provide useful properties in that, adding identifiers of items to a set of identifiers, does not affect how preexisting identifiers are scheduled to be visited. Thus, for example, adding new keys to a key-value store will not cause prior keys to be scheduled for visitation later or earlier than they would have had the new keys not been added.

In some embodiments, a visitation schedule (also referred to as simply a "schedule") is generated based at least in part on a reference point in time (referred to also as a "reference time"), such as the current Unix epoch time, discussed below. The reference time may be used to calculate a sequence basis which may be a value used as input to an algorithm that generates a sequence. The sequence basis may be, for instance, the reference time modulo a prime number. The prime number may be selected as a periodicity value representing the number of partitions of the set of items to be visited, where the partitions may be a collection of non-intersecting subsets of the set of items to be visited. Also, the union of the partitions may contain the set. As an example of a periodicity value, if desired to visit all items in a set in 43 hours, the prime number may be 43. A sequence is generated by adding integer multiples of the prime number to the sequence basis in successive order, such as described in more detail below.

This process of generating a sequence may be repeated for each division of a time period for which a schedule is generated. For instance, using 43 as an example of the prime number used, the process may be repeated 42 times (i.e., performed 43 times total), each time updating the sequence basis by adding one. The sequences resulting from each performance of the process may be put together, such as by concatenation to generate a sequence that includes values for all items to be visited. In this manner, a sequence of numbers having the above properties may be produced and used to define an order in which items are visited.

FIG. 1 shows an illustrative example of a diagram 100 that demonstrates various techniques in accordance with the present disclosure. In this example, various inputs are provided to a scheduler 102 to enable the scheduler 102 to generate a schedule 104. In this particular example illustrated in FIG. 1, the inputs to the scheduler are a maximum sequence value 106, a current time 108, and a periodicity 110, examples of which are described in more detail below. The scheduler 102, in an embodiment, is a computer system or a component of a computer system, such as a programming module, configured to receive various inputs and use the received inputs to generate a schedule. The scheduler 102 may be configured (e.g., through programming) to apply one or more algorithms to the received input to generate the schedule 104.

The schedule 104, in an embodiment, is an electronic document (or collection of documents) that encodes an ordering of items in a set for visitation of the items. The schedule 104 may encode the items in a structured format (e.g., using a structured markup language or comma separated values) that indicates the ordering of the items. The items may be indicated in the schedule by identifiers of the items. For example, in embodiments where the items are data objects associated with key values of a key-value data store (e.g., a NoSQL database), the schedule may encode the key values associated with their corresponding data objects. As another example, the items may be data blocks identified in a schedule by logical block addresses. Generally, each item may have a placement in the schedule, which may be a position in an ordering defined by the schedule relative to other items. Thus, in a sequence of values which may be encoded by a schedule, the positions of values associated with the items may determine the order in which items are visited.

In some examples, the schedule may organize the items as a list or other mechanism that indicates an order. The schedule may also organize a set of items into subsets, where the subsets are ordered and the items within the subset are ordered. The subsets may correspond, for example, to a time period (such as an hour) during which the items in the subset are to be visited according to the order indicated by the schedule. In some examples, the schedule encodes the items in a table or equivalent format with rows corresponding to hours (or other schedule demarcations) and the columns corresponding to an ordering of items. Thus, the order of items for a time period may be ascertained by a system processing the schedule 104 by, for a row corresponding to the time period, successively visiting each item identified in the row.

As noted above, various inputs may be provided to the scheduler 102 to facilitate the scheduler's generation of the schedule 104. In the illustrative example of FIG. 1, the inputs include a sequence maximum value 106, a current time 108, and a periodicity 110. In an embodiment, the sequence max value is a maximum value of a sequence that is used to generate item values (e.g., identifiers) for the items for which visitation is to be scheduled by the scheduler. An illustrative example of how a sequence is used is discussed below. Generally, the sequence maximum value 106 is a value that enables the scheduler 102 to determine a stopping point when building the schedule 104. The sequence maximum value may be received in various ways in accordance with various embodiments. For instance, a system using a sequence to serially generate key values may provide the sequence maximum value to the scheduler 102, such as in response to a request from the scheduler 102 to the system over a network. In other words, the scheduler 102 may query another system that is configured to respond to the query with the current sequence maximum value.

The current time, in an embodiment, is a value based on a reference point in history (i.e., reference time). The reference time may be a point in time used as a basis for calculations of sequence values, such as described in more detail below. In some embodiments, the current time is or otherwise based at least in part on the current Unix epoch time, which is the number of seconds since Jan. 1, 1970 00:00:00 Coordinated Universal Time (UTC), not counting leap seconds. In other examples, the current time is the time based on some reference time, which may be arbitrarily chosen. The current time may be received in various ways. For example, the scheduler 102 may be part of a system that includes a clock programming module that keeps time. The scheduler 102 may obtain the current time from the clock programming module. Further, in some embodiments, the scheduler 102 may query another system from another system configured to respond to the query with the current time. Further, the current time may be expressed in various ways. For instance, in some embodiments, the current time is rounded to the nearest hour. In the example of Unix epoch time, the Unix epoch time in seconds may be divided by 3600 (the number of seconds in an hour), with the remainder discarded or used for the purpose of rounding to the nearest integer value. It should be noted that, while various specific examples of specific implementations (e.g., Unix epoch time given in hours) are used for the purpose of illustration, various embodiments of the present disclosure are not limited to such specific implementations.

The periodicity 110, in an embodiment, is a value that indicates a number of periods into which the schedule 104 is to be organized. For example, in an embodiment, the periodicity is approximately the number of hours in a time period (e.g., a month or week) so that, over the time period, the schedule 104 will spread out visitation of the items to be visited relatively evenly over the time period. Further, in some embodiments, the periodicity is a prime number (i.e., a number whose only positive integer divisors are 1 and itself) which provides convenient properties for ensuring that all items of a set are included in the schedule 104.

Figure 2:
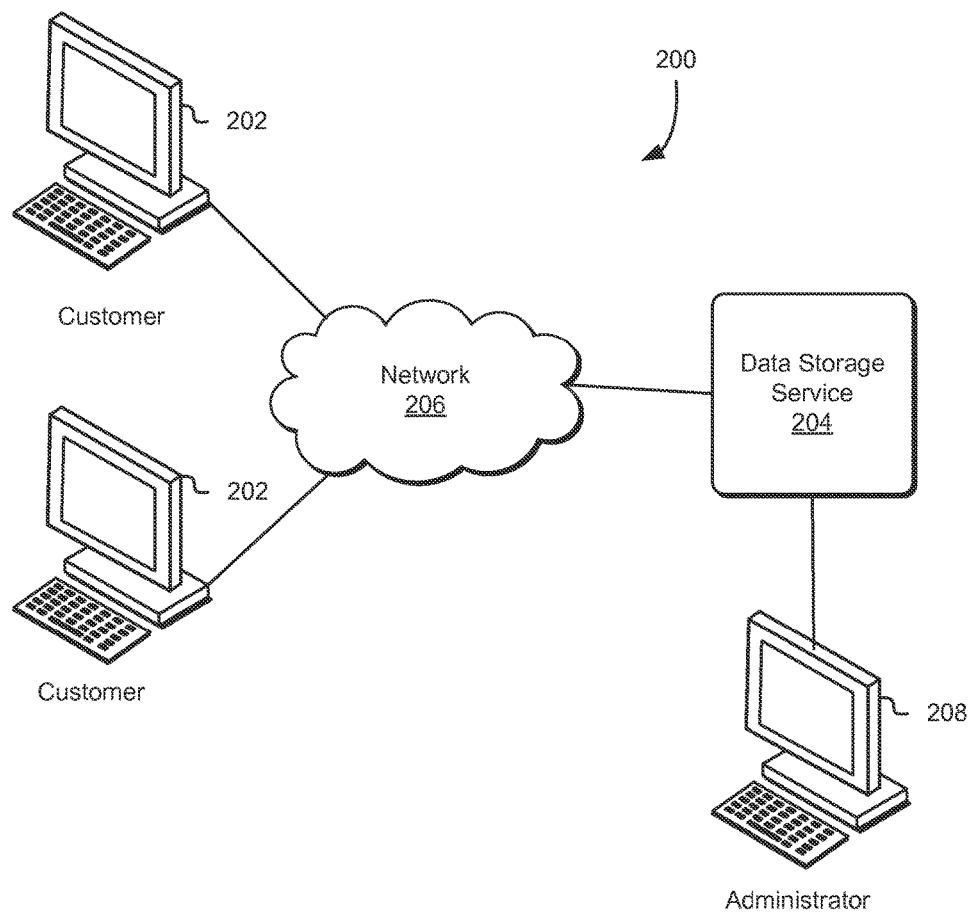
FIG. 2 shows an illustrative example of an environment in which various embodiments can be practiced.

FIG. 2 shows an illustrative example of an environment 200 in which various embodiments of the present disclosure may be practiced. The environment 200 is illustrative in nature and it should be noted that the techniques described herein (and variations thereof) are applicable in a wide range of other environments. In the environment 200, one or more customers 202 interact with a data storage service 204 over a network 206, such as the Internet and/or other network types described herein. The customers may be customers of a computing resource provider that operates the data storage service 204. The computing resource provider may be an organization that hosts various computing resources on behalf of one or more customers. For example, a computing resource provider may operate one or more facilities that are used to host various computing hardware resources, such as hardware servers, data storage devices, network devices, other devices discussed herein and other equipment, such as server racks, networking cables and the like. The computing resource hardware may utilize its computing hardware resources to operate one or more services, such as the data storage service 204. Such services may include services that enable customers of the computing resource provider to remotely manage computing resources to support the customers' operations while reducing or even eliminating the need of the customers to invest in physical equipment. Example services include, but are not limited to, various data storage services (object-based data storage services, archival data storage services, database services and the like), program execution services and other services. The services may be used by customers to support a wide variety of activities, such as operating a website, operating enterprise systems supporting an organization, distributed computation and/or other activities.

In many examples, the customers of the data storage service 204 are third-party customers although one or more of the customers 202 may be internal customers of a computing resource provider that operates the data storage service 204. For instance, a customer may be from a different service offered by the computing resource provider or even from the data storage service 204. Further, it should be noted that, when the present disclosure discusses customers interacting with the data storage service 204, the customers may interact with the data storage service 204 through appropriate devices, such as personal computers, mobile devices, tablet computers and/or other devices described herein. Further, while FIG. 2 illustrates the devices as personal computers, the customers may interact with the data storage service through automated systems, such as application servers programmed to automatically interact with the data storage service during their operations. Interacting with the data storage service 204 may include submitting Web service or other application programming interface calls to the data storage service 204 to utilize the services provided by the data storage service 204. Service may include data storage and retrieval and related operations, such as providing an inventory of objects stored, performing operations on stored data and/or other operations.

As illustrated in FIG. 2, an administrator 208 may have access to the data storage service. The Administrator 208 may, though an appropriate computing device, interact with the data storage service 204 to provide programmatic instructions for performing various administrative functions. For example, the administrator may provide instructions for various activities that involve visitation of sets of data objects stored by the data storage system. As one illustrative example, the data storage system may store data objects temporarily before they are migrated into an archival data storage system. A visitation schedule may be used to migrate the data objects to the data storage system. The administrator 208 may execute programmatic instructions that cause the administrator 208 to, according to a visitation schedule, migrate the data objects to the archival data storage system. In an embodiment, the administrator 208 processes the visitation schedule by transmitting application programming interface (API) calls to the data storage service 204 according to the visitation schedule. In alternate embodiments, however, the data storage service 204 may be configured to process the visitation schedule itself.

Figure 3:
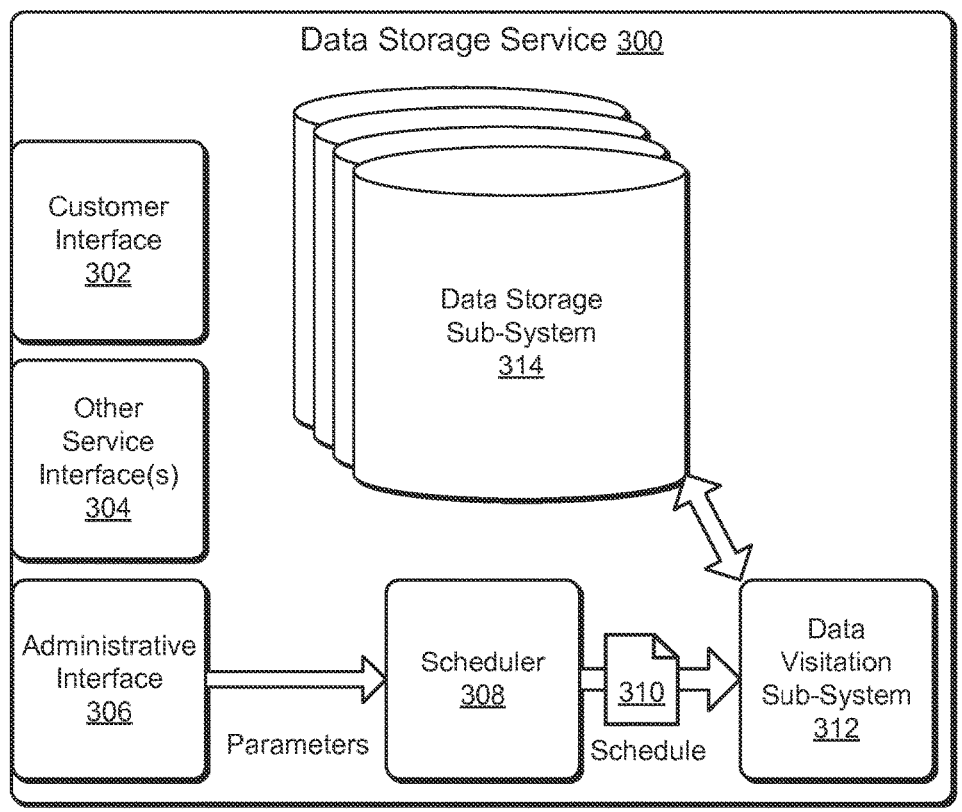
FIG. 3 shows an illustrative example of a data storage service with which various embodiments of the present disclosure can be practiced.

As noted above, techniques of the present disclosure are especially useful in contexts where data is stored by a data storage system and visitation of the items may be performed to improve one or more aspects of how the data is stored. FIG. 3 shows an illustrative example of a data storage service 300, which may be a data storage service such as described above. In this example, the data storage service 300 includes various components. For example, as illustrated, the data storage service is configured to provide a customer interface 302. The customer interface 302 may be a programmatic interface to which customers of the data storage service 300 are able to submit electronic requests to have the data storage service perform corresponding operations. Operations may include receiving an upload of data, retrieving data from storage, updating data in storage, providing an inventory of data in storage and/or other operations. The customer interface 302 may, for instance, be a Web service or other interface to which customers are able to submit Web service API calls.

The data storage service 300 may also include one or more other service interfaces 304. A service interface 304 may be an interface of the data storage service 300 that enables the data storage service to interact with one or more other services. In embodiments where the data storage service 300 is operated by a computing resource provider, the other services may be provided by the same computing resource provider or another computing resource provider. Through a service interface 304, the data storage service may transmit requests to another service and/or receive requests from one or more other services. In this manner, the data storage service 300 is configured to operate with other services to collectively fill customer needs. It should be noted that FIG. 3 is simplified for the purpose of illustration and that a data storage service 300 may include numerous components in addition to those that are illustrated in FIG. 3. For instance, the data storage service 300 may include components configured to authenticate and otherwise process requests submitted to it.

As illustrated in FIG. 3, the data storage service 300 may include an administrative interface 306, which may be an interface provided by the data storage service 300 to enable authorized entities (e.g., authorized users and/or systems) to perform administrative operations with the data storage service 300. The administrative operations may include those discussed above and also automated or other processes that enhance the operation of the data storage service. For example, the administrative operations may include operations that include visitation of a set of data objects for the purpose of improving one or more aspects of the data storage service's operations, such as improving storage efficiency, retrieval speed, durability and/or other aspects.

In an embodiment, the administrative interface 306 may be used to provide parameters to a scheduler 308, which may be a scheduler such as described above. The parameters may enable the scheduler to generate a visitation schedule 310 that may be utilized by the data storage service 300. The parameters may be, for example, input described above in connection with FIG. 1.

With parameters obtained from the administrative interface 306 and/or one or more other sources, the scheduler 308 may generate a visitation schedule 310. The visitation schedule, as noted above, may be a document (or collection of documents or, generally, organized collection of data) that encodes information from which an order in which elements of a set are to be visited can be determined by a system processing the document. Accordingly, as illustrated in FIG. 3, the scheduler 308 is operable to provide the visitation schedule 310 to a data visitation sub-system 312. The data visitation sub-system 312, in an embodiment, is a collection of computing resources (e.g., comprising one or more computing devices) collectively configured to operate in accordance with the visitation schedule 310. The data visitation sub-system may, for example, access data objects from a data storage sub-system 314 in an order determined from the visitation schedule 310. The data storage sub-system 314 may be a collection of computing resources (e.g., data storage devices, servers, switches, routers, etc.) collectively configured to store data for the data storage service 300. The data storage sub-system 314 may, for instance, may include arrays of data storage devices operably connected with computer systems configured to issue commands, such as small computer system interface over Internet Protocol (iSCSI) commands, to perform various data operations, such as read operations, write operations and/or other operations in connection with the storage of data. Electronic requests (e.g., appropriately configured API calls) transmitted to the customer interface 302 and/or one or more of the other service interfaces 304 may be fulfilled by storing data in or accessing data from the data storage sub-system 314. The data storage sub-system may include one or more databases that are used to track the location of data objects in the data storage devices of the data storage sub-system. The data storage sub-system may also include additional components for authentication, encryption and/or other purposes.

Visiting data objects in the data store may be performed in various ways in accordance with various embodiments and in accordance with the purpose for which the data objects are visited. In some examples, for instance, visiting the data objects may be performed by accessing and performing one or more operations on or in connection with the data objects in an order defined by the visitation schedule 310. The operations on a data object may include manipulating the data object, moving the data object, checking whether to perform one or more other operations, combining the data object with one or more other data objects, deleting the data object, encryption, decryption, compression, decompression, garbage collection and/or other operations. In some embodiments, the one or more operations on a data object include migrating the data object from one storage system to another storage system. One storage system may be, as an example, a storage system configured for relatively quick storage of data objects and access of stored data objects. The other storage system may be, as an example, an archival data storage system that is configured for optimization of storage costs and, as a result, stores and accesses data relatively slowly.

Further, variations in the timing in which data objects (or other items) are visited are also considered as being within the scope of the present disclosure. In some examples, a visitation schedule comprises a list of items to be visited. A system following the visitation schedule may visit the items sequentially according to the list. The system may, for example, visit the next item in the list upon finishing visitation of the immediately preceding item. As another example, the system may begin (or end) visitation of the items according to the order defined by the list. The system may also visit items in parallel (e.g., by having multiple components visiting items simultaneously). The manner in which items are processed in parallel, in some embodiments, may be defined by the visitation schedule. Other variations are also considered as being within the scope of the present disclosure.

Figure 4:
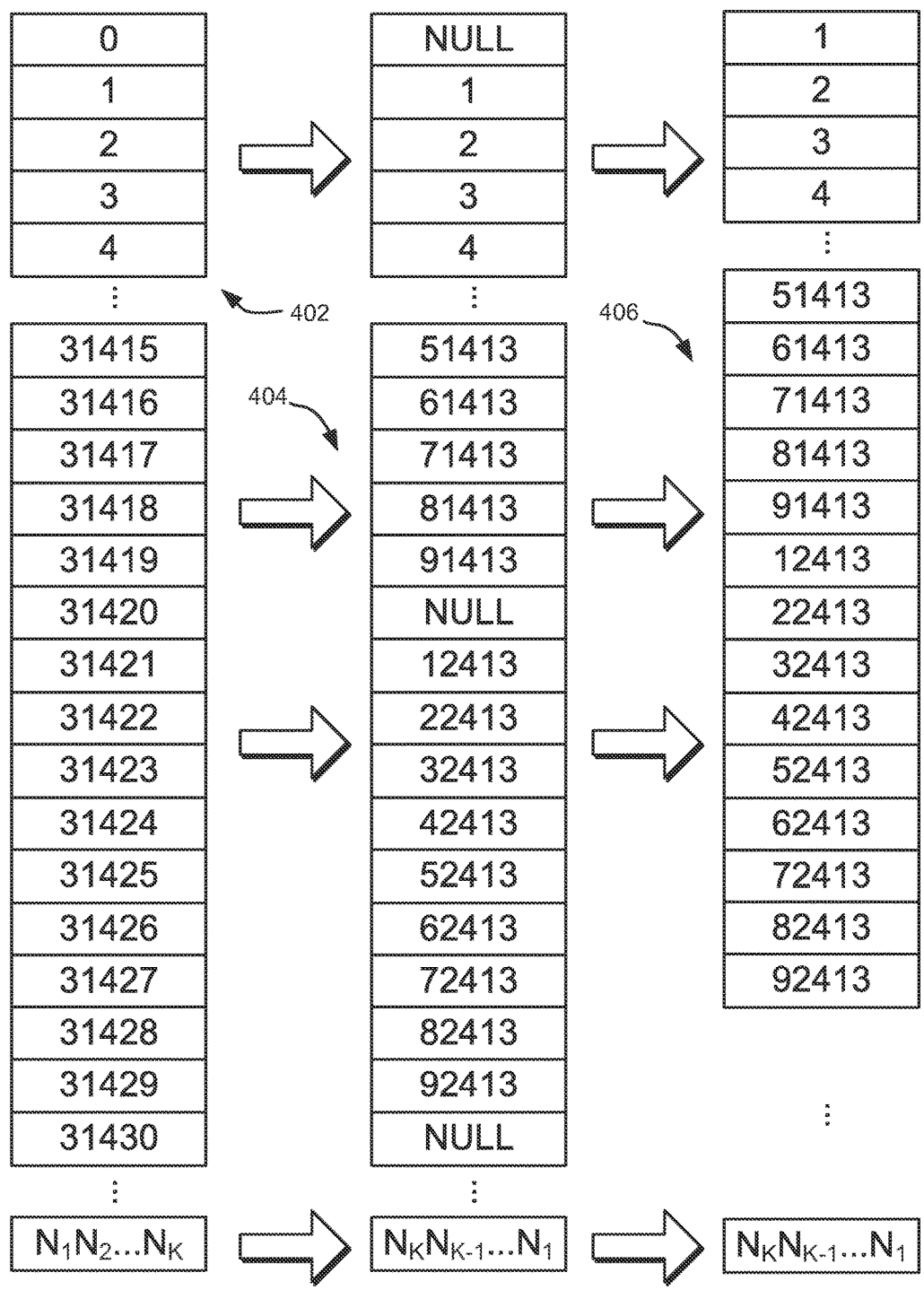
FIG. 4 shows an illustrative example of a technique for generating a sequence in accordance with at least one embodiment.

As noted above, techniques described herein enable visitation of elements in a manner that avoids clusters of visitations occurring in a manner that can cause significantly adverse effects on a system. FIG. 4 shows an illustrative example of how a sequence may be used to serially generate a sequence of item values (e.g., identifiers) for items to be visited by a visitation schedule. In FIG. 4, a first sequence 402 is generated. The first sequence 402 may be a monotonic sequence, where either: each successive value has a magnitude that is greater than the magnitude of the immediately preceding value; or each successive value has a magnitude that is less than the magnitude of the immediately preceding value. In this example, the first sequence 402 comprises serially ordered integers between and including zero and an integer identified in the figure by its digits, $N_1 N_2 \ldots N_K$. This sequence is provided explicitly for the purpose of illustration and other sequences, which may begin with different values and which may not proceed serially through the integers, may be used. As illustrated in FIG. 4, the first sequence can be used to generate a second sequence 404. In this illustrative example, the second sequence 404 is generated by removing from the first sequence any number ending in zero and reversing the digits of the number (or, equivalently, reversing the digits of the number and removing any number that, after reversal, has a leading zero). For example, the number zero becomes a null value, as does the number 31420 since both numbers, before reversal, end in zero. The number 31415 becomes 51413 since the number does not end in zero and, therefore, is reversed. The second sequence 404 may be used to generate a third sequence 406. Generation of the third sequence 406 from the second sequence 404 may be performed by removing null values in the second sequence 404 caused by members of the first sequence 402 having the last digit of zero. It should be noted that the number $N_1 N_2 \ldots N_K$ in FIG. 4 is assumed to not end in the integer zero since the number appears in the third sequence 406. If, for instance, the number $N_1 N_2 \ldots N_K$ ended in zero, the third sequence may end in the number $N_1 N_2 \ldots N_K-1$. It should be further noted that, while FIG. 4 shows numbers expressed in base ten (denary numbers) for the purpose of illustration, various embodiments of the present disclosure apply to other expressions of numbers, such as binary numbers or numbers generated in an ASCII-betical keyspace.

Figure 5:
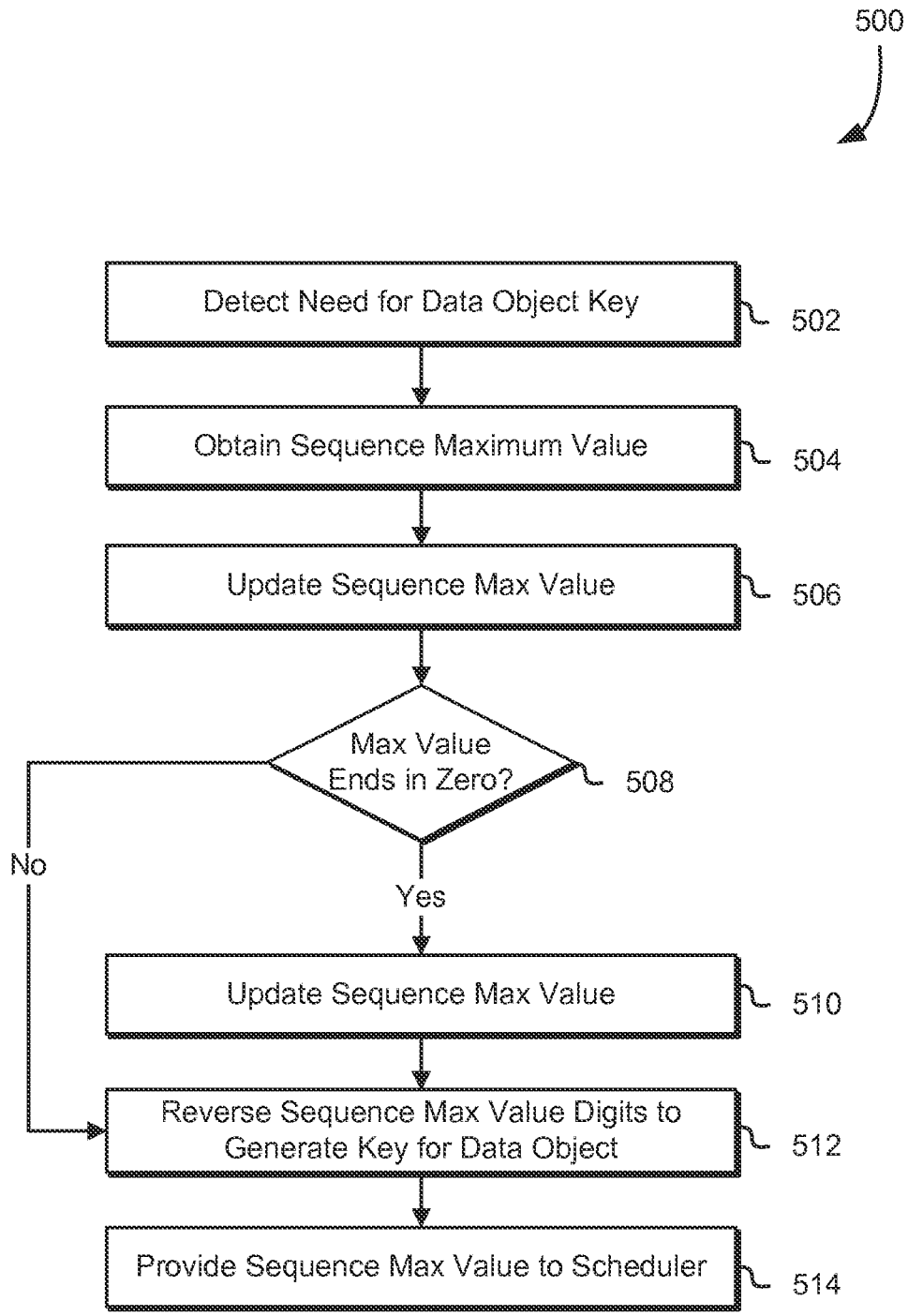
FIG. 5 shows an illustrative example of a process for generating data object keys in accordance with at least one embodiment.

As noted, sequences used to identify items that may be visited according to a visitation schedule. A sequence, such as the third sequence 406 in FIG. 4 may be pre-generated and used to name items as the need arises. For example, if the items are data objects, when a new data object is generated or otherwise obtained, the next number in the third sequence 406 may be used to identify the data object (such as by serving as a key or part of a key of a key-value store). For instance if the last data object was assigned 71413, the next data object may be assigned 81413. Sequence numbers may also be generated on demand. FIG. 5, accordingly, shows an illustrative example of a process 500 that may be used to generate a sequence, such as third sequence 406 discussed above in connection with FIG. 4. The process 500 may be performed by any suitable system, such as a data storage service that uses keys to identify data objects. A computer system of a data storage service may, for instance, be programmed with executable instructions that, when executed by one or more processors of the computer system, cause the computer system to perform the process 500 for the purpose of assigning keys to data objects.

As illustrated in FIG. 5, the process 500 includes detecting 502 a need for a data object key. Detecting 502 the need for the data object key may be performed in various ways in accordance with the various embodiments. For instance, in some embodiments, a need for a data object key may be detected when a data object is generated, uploaded or otherwise obtained and there is a need to obtain a key for the data object, such as to be able to access the data object from a key-value store. Upon detecting 502 the need for a data object key, the process 500 may include obtaining 504 a maximum sequence value. The maximum sequence value may be the latest value of a sequence that is used to generate keys for data objects. For example, if N numbers in a sequence have been either used to generate a key or discarded, the maximum sequence value may be N. The process 500 may then include updating 506 the maximum sequence value. In some embodiments, updating 506 the maximum sequence value includes adding one to the maximum sequence value so that, if the maximum sequence value is N, the updated maximum sequence value is N+1. It should be noted that other ways of updating the maximum sequence value may also be used, such as by adding different values than one or obtaining the output of a function that takes as an input the maximum sequence value. A determination may then be made 508 whether the updated maximum sequence value ends in a zero. If determined 508 that the updated maximum sequence value ends in zero, the process 500 may include updating 510 the maximum sequence value once more (so that the maximum sequence value does not end in zero). It should be noted that, in variations of the process 500, such as when updating is performed differently and does not guarantee that the next updated value will not end in zero, the process may proceed differently. In particular, the process may be modified such that the process includes repeatedly updating 506 the maximum sequence value and determining 508 whether the updated maximum sequence value ends in zero until the updated maximum sequence value does not end in zero.

Returning to the illustrative embodiment, if determined 508 that the updated maximum sequence value does not end in zero, the process may include reversing 512 the updated maximum sequence value to generate a key for the data object. The reversed updated maximum sequence value may become the key, for instance, or may be used as part of the key, such as the leading characters of the key. In an embodiment, the process 500 also includes providing 512 the updated maximum sequence value to a scheduler (or to multiple schedulers) to enable the scheduler to use the sequence maximum value to generate a schedule to visit data objects that may include data objects having associated keys generated according to the process 500, or variations thereof. Providing 512 the sequence maximum value to a scheduler may be performed in various ways in accordance with the various embodiments. For instance, an electronic notification message containing the maximum sequence value may be sent to a scheduler, either locally or over a network. Alternatively, the scheduler may query a system that performed the process 500 (or a variation thereof or another system that has access to the maximum sequence value that itself obtained the maximum sequence value from the system that performed the process) and receive the maximum sequence value in response.

Figure 6:
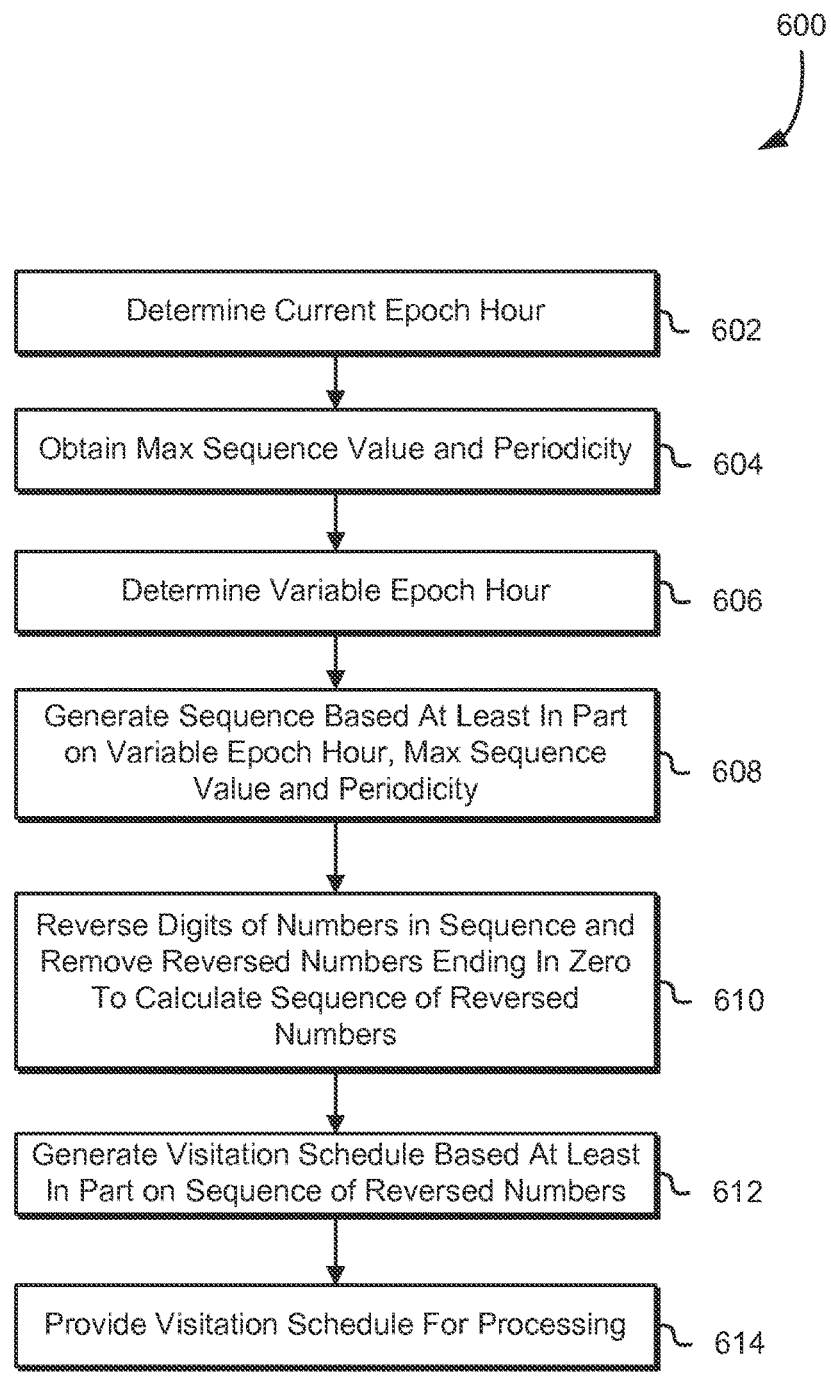
FIG. 6 shows an illustrative example of a process for providing a visitation schedule in accordance with at least one embodiment.

As discussed above, various embodiments of the present disclosure relate to generation of a visitation schedule. FIG. 6, accordingly, shows an illustrative example of a process 600 that may be used to generate a visitation schedule for a set of items to be visited, such as data objects accessible using corresponding keys for the data objects. The process 600 may be performed, for instance by a scheduler, such as described above. Further, the process 600 may be used to generate a schedule for a current hour. In an embodiment, the process 600 includes determining 602 a current epoch hour, which may be the current hour according to current Unix epoch time, which is the number of seconds since Jan. 1, 1970 00:00:00 Coordinated Universal Time (UTC), not counting leap seconds.

It should be noted that the current epoch hour is used for the purpose of illustration and that different temporal reference points may be used. For example, the current hour counting from any reference time could be used. As another example, the current hour according to International Atomic Time (TAI) may be used. Determining the current epoch hour may be performed in various ways. For instance, a call to a service (e.g., provided by a network time protocol (NTP) server) may be used to obtain the current epoch time, which may be used to calculate the current epoch hour. A system performing the process 600 may also keep epoch time itself (or time from a particular reference time, such as a time since first startup). In many examples, obtaining the current epoch hour is performed by obtaining the current epoch time in seconds, dividing the current epoch time in seconds by 3600 (the number of seconds in an hour), and discarding any remainder.

As illustrated in FIG. 6, the process 600 may include obtaining 604 a maximum sequence value and a periodicity. The maximum sequence value and periodicity may be values such as described above. Further, the maximum sequence value and periodicity may be obtained 604 in separate operations or in a single operation and may be obtained from a local or remote data store. Once obtained, the process 600 may include determining 606 a variable epoch hour based at least in part on the current epoch hour and the periodicity. For example, in some embodiments, the variable epoch hour is calculated as the epoch hour modulo the periodicity, that is, the remainder of division of the epoch hour divided by the periodicity.

Once the variable epoch hour has been determined 606, the process 600 may include generating 608 a sequence based at least in part on the variable epoch hour, the maximum sequence value and periodicity. In some embodiments, the sequence is generated as:

$$\{V+i*P\}_{i=0}^{M}$$

where V represents the variable epoch hour, P represents the periodicity, M represents the greatest positive integer such that V+M*P is less than or equal to the maximum sequence number and i represents an index for the sequence. Thus, in some embodiments, the resulting sequence is:

$$\{V, V+P, V+2P, V+3P, V+4P, \ldots, V+MP\}.$$

Once the sequence has been generated 608, the process 600 may include reversing the digits of the numbers in the sequence and removing reversed numbers ending in zero to calculate 610 a sequence of reversed numbers. Once generated 610, the sequence of reversed numbers may be used to generate 612 a visitation schedule. The sequence of reversed numbers may, for instance, be encoded into a document that is then provided 614 for processing (e.g., for visiting items according to the schedule). As another example, the sequence of reversed numbers may be used to generate a sequence of identifiers of items, such as data object keys, based at least in part on associations of members of the sequence of reversed numbers with the items in one or more mappings. For example, items to be visited may be associated by a data store with numbers in an ascending numerical sequence. The order of the sequence of reversed numbers may determine the order of visitation of the items due to the associations in the data store.

The process 600 may be used in various ways. For example, the current epoch hour may be increased by one P-1 times and the process 600 (or a portion thereof including generation of the visitation schedule) may be performed for each incremental increase of the current epoch hour. In this manner, a visitation schedule may be generated for each hour in a period defined by the periodicity P. The visitation schedules for each hour may be combined to form a visitation schedule for the whole period. Alternatively, the process 600 may, at hour intervals, be repeated for an updated current epoch hour. In other words, the process 600 may be performed each hour during a period to generate a schedule for each hour as needed.

It should be noted that the process 600 and other techniques described herein use hours for the purpose of illustration and that other time periods or reference times (which are not necessarily temporal) may be used. For example, in various contexts schedules that use seconds, minutes, days, weeks, months or other time intervals may be used. As another example, the techniques described herein do not necessarily need to be tied to a clock. For instance, instead of performing the process 600 for each hour in a period of hours, the process 600 may be performed for each integer in a period defining a range of integers, where the integers do not necessarily refer to times. The integers may, for instance, represent merely iterations of the process 600. The starting point for the integer, that is updated for each performance of the process 600 may be zero, one, or some other integer. Further, while certain operations (e.g., addition) are used for the purpose of illustration, other operations may be used. For example, instead of adding multiples of the periodicity to generate a sequence, multiples of the periodicity may be subtracted and the absolute value (i.e., numerical distance from zero expressed as a positive number) of the result of the subtraction may be used. Generally, many other variations are considered as being within the scope of the present disclosure.

Other variations of the process 600 are also considered as being within the scope of the present disclosure. For example, as described above, the process 600 includes obtaining various values that are used to generate a sequence (e.g., sequence of reversed numbers) from which a visitation schedule is generated. In some embodiments, a system that generates a visitation schedule (e.g., scheduler as described above) receives a sequence from another system and generates a visitation schedule based, at least in part, on the received sequence. The sequence may be generated in any suitable manner, such as described above in connection with FIG. 6, or, in some embodiments, randomly or pseudo-randomly in a manner that ensures the sequence contains a value that is associated with an item for each item to be visited. The system that receives the sequence may generate a sequence by repeatedly selecting from the sequence every $P^{th}$ value (where P may be a prime number, such as a periodicity), each time beginning at a different starting point in the sequence such that, after P–1 repetitions (i.e., proceeding through the sequence P times), every value in the sequence is selected. The order of selection may be determinative of the order in which items are to be visited according to the visitation schedule.

Figure 7:
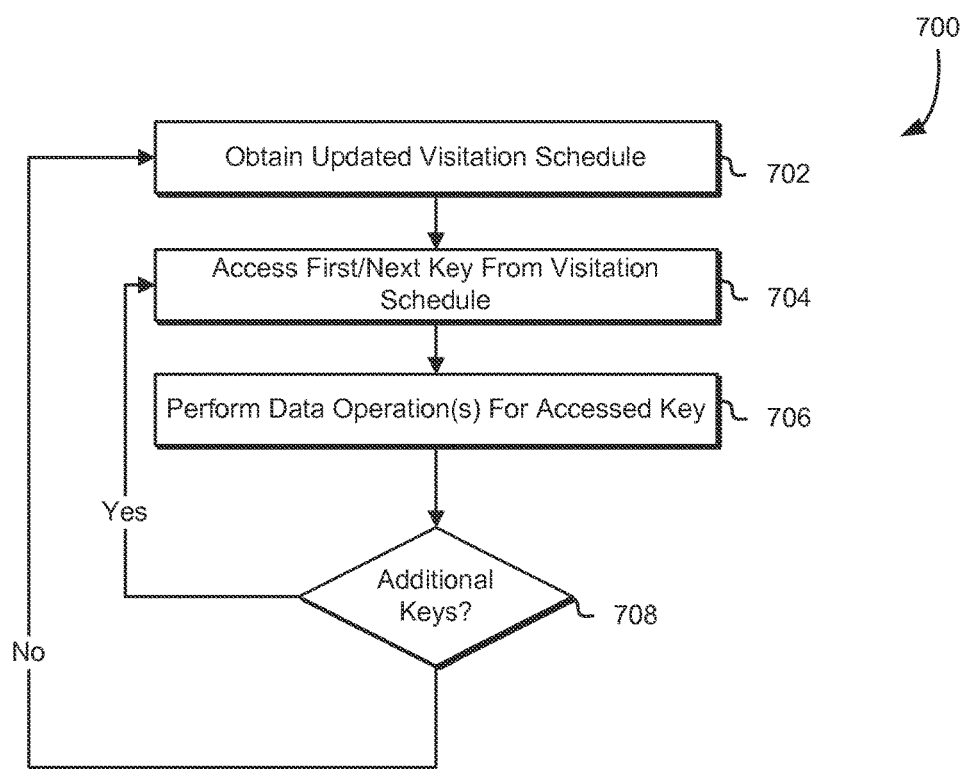
FIG. 7 shows an illustrative example of a process for utilizing a visitation schedule in accordance with at least one embodiment.

As noted, techniques for generating visitation schedules are particularly useful in context were the items visited are data objects that are each associated with a key, such as in a key-value store. FIG. 7, accordingly, shows an illustrative example of a process 700 for processing a visitation schedule in accordance with various embodiments. The process 700 may be performed by any suitable computer system, such as data visitation sub-system discussed above in connection with FIG. 3. As illustrated, the process 700 includes obtaining 702 an updated visitation schedule. The updated visitation schedule 702 may be obtained in any suitable manner, such as over a network from another system, such as a scheduler or system implementing a scheduler, discussed above, by accessing the visitation schedule from a local data store or by generating the schedule itself. In other words, a system performing the process 700 may obtain the updated visitation schedule from another system or itself.

In an embodiment, once the updated visitation schedule has been obtained, the process 700 includes accessing 704 a first key from the obtained visitation schedule. The first key may be, as an example, a key in the visitation schedule that precedes all other keys in the visitation schedule or may be a key in the visitation schedule that is first accessed, whether or not any other keys precede the first key in a list. Accessing the key may be performed in various ways in accordance with various embodiments. For instance, accessing the first key may include extracting the first key from the document or from local memory. In some embodiments, the first key may not be encoded in the visitation schedule, but may be accessible using information from the visitation schedule. For instance, the visitation schedule may not include the first key itself, but may include a reference to the first key. Once the first key has been accessed 704, the process 700 may include performing 706 one or more data operations on data corresponding to the first key. The one or more operations may be operations such as those discussed above. As one illustrative example, the first key corresponds to data in a data storage system. The one or more data operations may include migrating the data from the storage system to another storage system. Migrating the data may include accessing the data from the storage system in which the data is stored (e.g., via an appropriately configured API call to the data storage system), transmitting the data to the other data storage system (e.g., also via an appropriately configured API call to the other data storage system), deleting or allowing the data in the original storage system to be overwritten, and updating one or more data stores to indicate storage of the data in the other data storage system so as to enable location of the data.

Once the one or more data operations have been performed (or initiated, scheduled or otherwise caused to be performed), the process 700 may include determining 708 whether there are additional keys in the visitation schedule. There may be additional keys in the visitation schedule, for instance, if the visitation schedule contains one or more keys for which one or more data operations have been performed (or otherwise caused to be performed). If determined 708 that there are additional keys, the process 700 may be repeated as described above for the next key in the visitation schedule. For instance, the next key may be accessed, one or more data operations may be performed for data corresponding to the next key and a determination may be made 708 whether there are any additional keys. Once determined 708 that there are no additional keys, the process 700 may include obtaining an updated visitation schedule. It should be noted that obtaining 708 the updated visitation schedule may not be performed immediately. For instance, the updated visitation schedule is performed on a period or approximately period basis. In one example, an updated visitation schedule is obtained hourly, such as when the current epoch hour is used to determine the visitation schedule.

Also, as noted above, numerous other variations are also considered as being within the scope of the present disclosure. For instance, the process 700 may be modified to obtain or otherwise determine batches of keys using the visitation schedule. The batches may be for batch processing and/or for performing data operations in parallel. Generally, the process 700 may be modified to process the items in a visitation schedule in any way where the visitation schedule is determinative and/or informative of when operations should be performed for various items.

Visitation schedules generated in accordance with the various embodiments may be used in a wide range of circumstances. For example, visitation schedules generated in accordance with the various embodiments may be used in circumstances where spreading load among computing resources in an effective way can improve performance of a system or at least avoid poor performance. For instance, a visitation schedule generated in accordance with the present disclosure may be used by a load balancer, which may be a network computing device configured to balance load among a set of computing resources, such as, for instance, by spreading web requests evenly among a cluster of web servers. In such examples, a visitation schedule such as described above may be used to determine which computing resource a request is forwarded to. Each computing resource of a cluster, for instance, may have a sequence number. A visitation schedule may be used to determine an order in which requests are allocated.

Figure 8:
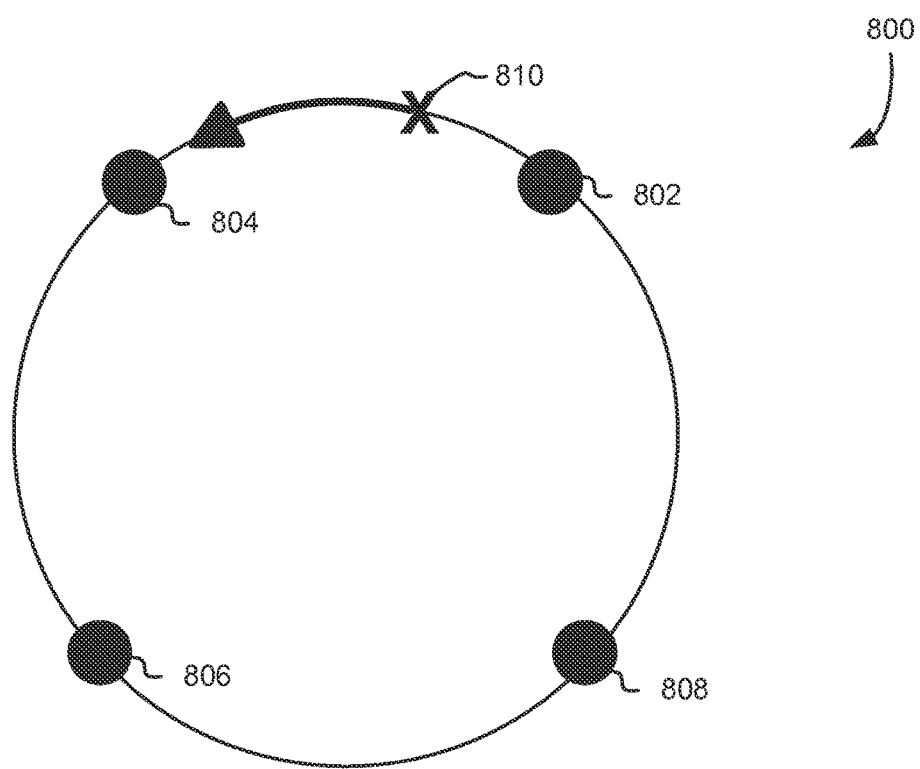
FIG. 8 shows an illustrative example of a diagram representing use of a visitation schedule for node assignments in accordance with at least one embodiment.

Visitation schedules produced in accordance with the various embodiments may also be used to spread writes to a cluster of database nodes, in a manner similar to consistent hashing. For example, load on various nodes in a distributed system (e.g., web servers in a cluster of web servers or database nodes in a cluster of database nodes). FIG. 8, for example, shows an illustrative example of a consistent hashing circle 800 in accordance with an embodiment. In this particular example, a cluster of computing nodes includes four nodes, 802, 804, 806 and 808, although clusters of different numbers of nodes are also within the scope of the present disclosure. A load distributing system (e.g., load balancer, not shown) distributes requests or other load-causing events to the nodes. In an embodiment, angles on the circle 800 (based on a reference angle of the circle 800) are assigned sequence numbers which may be generated such as described above. As one example, each degree of the circle may be assigned, in order, a sequence number from a sequence generated as described above, although other divisions of the circle (i.e., more or fewer angles) may be used. For each successive request, a next number in a visitation schedule may be used to locate a corresponding point on the circle 800. For example, if the next item in the visitation schedule is 971, the angle of the circle assigned sequence number 971 is located and used to select a node from the four nodes. Selecting the node may be performed by selecting the node having the sequence number of, if no node has the sequence number, selecting the node with angular distance closest (in a predetermined direction) to the point on the circle having the sequence number. For instance, referring to FIG. 8, a point 810 on the circle 800 is used to select the second node 804 because, in this example, the predetermined direction is counterclockwise and traversing the circle 800 counterclockwise from the point 812 results in contacting the point representing the second node 804 before contacting any other points representative of a node.

Numerous other variations are also considered as being within the scope of the present disclosure. For instance, in some embodiments, the techniques described above may be used to hierarchically generate visitation schedules. In some examples, a database (e.g., a key-value store) may associate data objects with multiple keys, where there is not necessarily a one-to-one correspondence between data objects and keys. There may be, for instance, a group key for each of a plurality of sets of data objects. Each set may have a corresponding group key that uniquely identifies the set, but not the members of the set. The data objects in each set may have corresponding keys (data object keys) associated with the group key for the set, but that are not necessarily unique in the database as a whole. Data objects in different sets may, for instance, share the same data object key, but not the same group key. In other words, a single key may not uniquely identify a data object, but a combination of keys may identify the data object. The techniques described above may be used to generate a schedule according to which the sets of data objects are visited and, for each set, another schedule according to which the items in the set are visited. Additional hierarchical layers may be used to achieve scalability. For instance, using the above example, a data object may require three keys for identification: a data object key; a group key; and another key that identifies a set of sets of which the key's set is a member. An additional schedule can be generated to determine the order in which sets of sets are visited. This can be extended to additional hierarchical levels.

Figure 9:
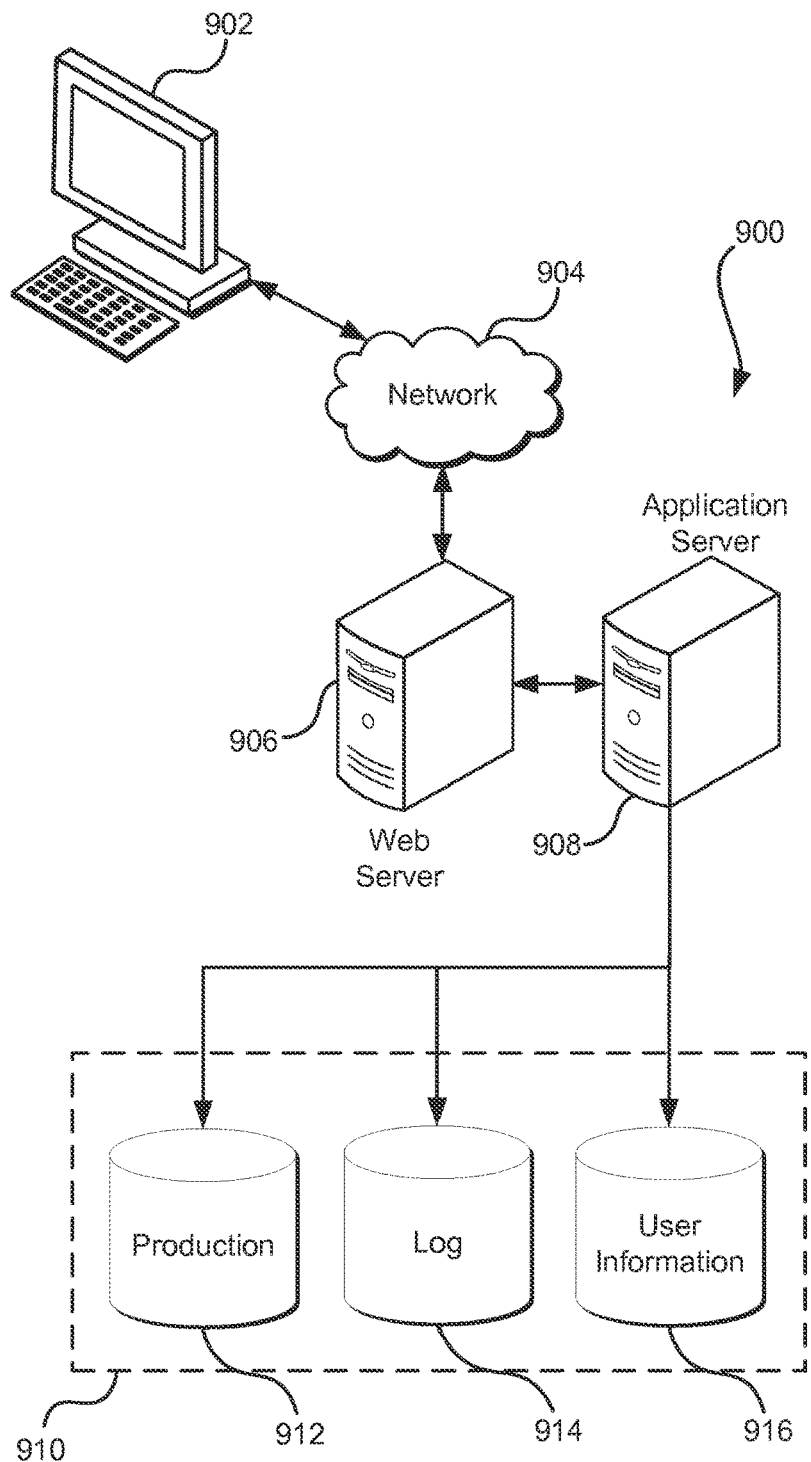
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 910 can include several separate data tables, databases or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser. It should be noted, however, that embodiments of the present disclosure are not necessarily limited to the context of Web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limited to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   determining:
      a sequence basis based at least in part on a reference time;
      a maximum sequence value for a first sequence used to generate identifiers for a set of data objects; and
      a periodicity value that indicates a number of partitions of the set of data objects to be visited, the set of data objects being associated with a data storage system connected to one or more computer systems;
   updating the first sequence, based at least in part on the sequence basis, the maximum sequence value, and the periodicity value;
   generating, based at least in part on a set of values in the first sequence, a second sequence, at least one member of the second sequence including an identifier of a data object in the set of data objects; and
   processing the set of data objects, by at least, migrating the data object of the set of data objects from the data storage system to a second data storage system based at least in part on the identifier of the data object corresponding to the at least one member of the second sequence and based at least in part on an order defined by the second sequence.

2. The computer-implemented method of claim 1, wherein generating the first sequence comprises generating values that are different integer multiples of the periodicity value.

3. The computer-implemented method of claim 1, wherein generating the second sequence comprises removing, from the first sequence, one or more values that, if unremoved, would result in redundant values in the second sequence.

4. The computer-implemented method of claim 1, wherein the sequence basis is further based at least in part on a current time.

5. The computer-implemented method of claim 1, wherein processing the set of data objects further includes migrating a second data object of the set of data objects from the data storage system to the second data storage system based at least in part on the order defined by the second sequence and a second identifier of the second data object corresponding to a second member of the second sequence as defined by the order.

6. The computer-implemented method of claim 1, wherein the second sequence is generated further based at least in part on a plurality of other first sequences each generated based at least in part on a different sequence basis.

7. A computer-implemented method, comprising:
   in connection with one or more requests to process a plurality of items, associating a subset of items of the plurality of items with a corresponding value to generate a first plurality of values, the plurality of items including data objects stored on a data storage system separate from and in communication with one or more computer systems;
   generating a first sequence comprising a second plurality of values, at least a subset of which are based at least in part on a first value and a second value, the first value being based at least in part on a reference time, and including an identifier of a respective item of the plurality of items, the second value being based at least in part on a maximum sequence value associated with the first plurality of values;
   generating a second sequence based at least in part on the first sequence, wherein generating the second sequence comprises excluding at least one value of the first sequence from the second sequence that, if not otherwise excluded, would result in a redundant value in the second sequence; and
   processing the plurality of items in accordance with the one or more requests and based at least in part on a placement of the item identifiers in the second sequence by at least migrating the data objects from the data storage system to another data storage system based at least in part on the placement and the data objects corresponding to the item identifiers.

8. The computer-implemented method of claim 7, wherein the first value is based at least in part on a number of time units since the reference time.

9. The computer-implemented method of claim 8, wherein the first value is calculated based at least in part of a calculation of the number of time units since the reference time modulo the second value.

10. The computer-implemented method of claim 7, wherein:
    the second value is a number of partitions of the plurality of items; and
    generating the second sequence includes generating a sub-sequence for each partition of the plurality of items.

11. The computer-implemented method of claim 7, wherein processing the plurality of items includes processing the data objects in an order defined by the second sequence based at least in part on the placement of the item identifiers in the second sequence.

12. The computer-implemented method of claim 7, wherein processing the plurality of items includes performing a garbage collection process.

13. A system, comprising:
    one or more processors; and
    memory including instructions that, when executed by the one or more processors, cause the system to at least:
       generate a plurality of sequences that collectively comprise a plurality of values from an ordered set and that are collectively configured such that at least some sets of consecutive values are distributed among multiple sequences from the plurality of sequences;
       remove, from a first sequence generated based at least in part from a second sequence of the plurality of sequences, one or more values that, if unremoved, would result in redundant values in the first sequence; and
       cause a plurality of data objects stored on a data storage system, separate from the system, to be migrated, where the plurality of data objects correspond to a plurality of items to be processed in an order dependent on the first sequence based at least in part on item values of the plurality of items in the first sequence, the item values of the plurality of items in the first sequence generated for the items based at least in part on a monotonic sequence used to successively identify one or more items of the plurality of items with a corresponding item value and a maximum sequence value for a subset of the plurality of sequences.

14. The system of claim 13, wherein the order in which the plurality of items are to be processed is further dependent on a second order of the plurality of sequences.

15. The system of claim 13, wherein each sequence from the plurality of sequences is generated based at least in part on a corresponding measurement of time relative to a reference time.

16. The system of claim 13, wherein each sequence from the plurality of sequences is generated based at least in part on successive multiples of a number of sequences in the plurality computed modulo a prime number.

17. The system of claim 13, wherein the items are data objects.

18. The system of claim 17, wherein causing the plurality of items to be processed includes performing one or more operations on the data objects that affect how the data objects are stored.

19. A non-transitory computer-readable storage medium having stored thereon instructions that, when processed by one or more processors of a computer system, cause the computer system to:
  in connection with a plurality of requests to process a plurality of items, the plurality of items including one or more data objects stored in connection with a data storage system separate from the computer system, generate a first sequence comprising a plurality of values, a subset of which based at least in part on a first value and a second value, the first value being based at least in part on a reference time, the second value being based at least in part on a maximum sequence value defined for the first sequence;
  generate a second sequence based at least in part on the plurality of values, wherein generating the second sequence comprises excluding one or more values from the plurality of values that, if included in the second sequence, would result in redundant values in the second sequence; and
  cause the plurality of items to be migrated from the data storage system to one or more other data storage systems in accordance with the plurality of requests, and in an order based at least in part on positions of values associated with items in the second sequence, the values associated with the items based at least in part on a monotonic sequence used to successively identify items of the plurality of items using a corresponding item value mapped to a value of the plurality of values, the monotonic sequence being different from the second sequence.

20. The non-transitory computer-readable storage medium of claim 19, wherein:
  the first sequence is associated with an amount of time since the reference time; and
  the first value is based at least in part on the amount of time since the reference time.

21. The non-transitory computer-readable storage medium of claim 20, wherein the first value is further based at least in part on a periodicity value that indicates a number of partitions of the plurality of items to be visited.

22. The non-transitory computer-readable storage medium of claim 19, wherein generating the first sequence comprises generating a plurality of sub-sequences, each sub-sequence generated based at least in part on a different value that is based at least in part on the first value.

23. The non-transitory computer-readable storage medium of claim 19, wherein the non-transitory computer-readable storage medium further includes instructions that, when processed by one or more processors of the computer system, cause the computer system to process the plurality of items by at least changing a manner in which at least some of the items are stored.

24. The non-transitory computer-readable storage medium of claim 19, wherein the non-transitory computer-readable storage medium further includes instructions that, when processed by one or more processors of the computer system, cause the computer system to process the plurality of items by at least performing a garbage collection process.

* * * * *